(12) United States Patent
Kogan et al.

(10) Patent No.: US 6,757,063 B2
(45) Date of Patent: Jun. 29, 2004

(54) METHOD AND APPARATUS FOR PRECISION ALIGNMENT AND ASSEMBLY OF OPTO-ELECTRONIC COMPONENTS FOR FIBER-OPTIC NETWORKS

(75) Inventors: Yakov Kogan, Wayland, MA (US); Kevin J. McCallion, Charlestown, MA (US); Farhang Sakhitab, Chestnut Hill, MA (US)

(73) Assignee: Nortel Networks, Ltd, St. Laurent (CA)

( * ) Notice: Subject to any disclaimer, the term of this patent is extended or adjusted under 35 U.S.C. 154(b) by 178 days.

(21) Appl. No.: 10/112,256

(22) Filed: Mar. 29, 2002

(65) Prior Publication Data

US 2003/0184752 A1 Oct. 2, 2003

(51) Int. Cl.[7] .............................................. G01B 11/00
(52) U.S. Cl. ...................................... 356/399; 356/400
(58) Field of Search ................................ 356/399, 400, 356/614, 615

(56) References Cited

U.S. PATENT DOCUMENTS 5,916,458 A * 6/1999 Komoriya et al. ...... 219/121.63
6,504,611 B2 * 1/2003 Kogan et al. ............... 356/399
6,678,047 B1 * 1/2004 Miyazaki et al. ........... 356/399

* cited by examiner

Primary Examiner—Frank G. Font
Assistant Examiner—Layla Lauchman
(74) Attorney, Agent, or Firm—John C. Gorecki

(57) ABSTRACT

Method and apparatus for optically aligning, for subsequent assembly into discrete packages, opto-mechanical components, e.g., optical filters, and lenses for directing direct light to and from those opto-mechanical components. The apparatus comprises a light source for producing a beam of light emulating the light which exists in the assembled package of components during use, manipulator means for supporting a lens and a selected opto-mechanical component in tandem along the optical axis of the light beam and for moving the lens and selected opto-mechanical component along X and Y axes perpendicular to that optical axis, and a machine vision system having imaging means for recording images of the light beam and the opto-mechanical component and being adapted to control operation of the manipulator means so as to cause the latter to shift the lens and opto-mechanical component along the X and/or Y axes to achieve optical alignment.

23 Claims, 2 Drawing Sheets

US 6,757,063 B2

METHOD AND APPARATUS FOR PRECISION ALIGNMENT AND ASSEMBLY OF OPTO-ELECTRONIC COMPONENTS FOR FIBER-OPTIC NETWORKS

FIELD OF THE INVENTION

This invention relates to methods and apparatus for the alignment and assembly of opto-electronic components in general and, more particularly, to precision alignment and assembly of microelectromechanical ("MEM") components for use in fiber-optic networks.

BACKGROUND OF THE INVENTION

In order to facilitate the large volume production of fiber-optic telecommunication assemblies, it is necessary to develop high productivity methods for manufacturing precision opto-mechanical assemblies. This includes avoiding, as much as possible, (1) the need to actively align components using measured optical performance as feedback, and (2) the need to maintain high mechanical tolerances during assembly so as to achieve the required optical performance.

The assembly of fiber-optic telecommunication components often include the alignment of an optical element (e.g., an optical filter, an optical switch pump laser, a Fabry-Perot tunable filter, a vertical cavity surface emitting laser, etc.) to a lens (or a system of lenses) which directs light to or from the optical element. Significantly, many new MEM-based devices of the sort which may be used in fiber-optic component assemblies have a well-defined geometric pattern in a plane perpendicular to the optical axis of the device. See, for example, pending prior U.S. patent application Ser. No. 09/105,399, filed Jun. 26, 1998 by Parviz Tayebati et al. for MICROELECTROMECHANICALLY TUNABLE, CONFOCAL, VERTICAL CAVITY SURFACE EMITTING LASER AND FABRY-PEROT FILTER, which patent application discloses tunable Fabry-Perot filters and tunable vertical cavity surface emitting lasers (VCSEL's). The fact that many new optical devices have the aforementioned well-defined geometric patterns opens up new possibilities for utilizing machine vision systems to assist in the precision alignment and assembly of fiber-optic components.

Some known methods for assembling lens systems utilize the imaging of light propagating through a machine vision system to measure the centers of lenses in the assembly. However, these methods do not involve imaging or utilizing the images of any geometrical features of the components that are being assembled.

Other assembly methods are known in which the alignment of components is based solely on images of the geometrical features of those components. In these latter types of alignment techniques, the component is imaged before it is positioned in its assembly rather than during the positioning operation. However, such alignment methods are highly susceptible to positioning errors due to any movement that occurs after imaging, and also due to movement that occurs while positioning the component. Very precise positioning mechanisms can be utilized to reduce the errors induced by these movements. However, these high precision positioning mechanisms add significantly to the cost of manufacturing the overall product.

SUMMARY OF THE INVENTION

As a result, one object of the present invention is to provide novel apparatus for the precise alignment and assembly of opto-electronic components.

Another object of the present invention is to provide a novel method for the precise alignment and assembly of opto-electronic components.

With the above and other objects in view, as will hereinafter appear, there is provided a method for aligning a lens and an opto-electronic device for assembly into a discrete package, the method comprising:

producing a light beam of a selected shape and wavelength and directing it along a selected path to an imaging device, whereby a first spot image of the light beam is formed on the imaging device;

recording the first spot image produced on the imaging device;

determining the coordinates of the center of the first spot image;

positioning a lens so that (a) it intersects the axis of the light beam and (b) its center axis extends substantially parallel to the axis of the light beam, whereby the light beam passes through and is modified by the lens and a second spot image of the modified light beam is formed on the imaging device;

recording the second spot image produced on the imaging device;

determining the coordinates of the center of the second spot image;

moving, while the light source is energized, the lens laterally of the light beam until the center of the second spot image coincides with the center of the first spot image;

positioning a selected opto-electronic device with an optical axis between the lens and the imaging device so that (a) it is adjacent to the lens, (b) it intersects the center axis of the light beam and (c) its optical axis extends substantially parallel to the axis of the light beam;

producing, while the light source is de-energized, an image of the opto-electronic device on the imaging device;

recording the image of the opto-electronic device;

comparing the image of the opto-electronic device with a pre-recorded geometrical pattern and determining from such comparison the X and Y coordinates of the optical axis of the opto-electronic device; and moving the opto-electronic device until the X and Y coordinates of its the optical axis coincide with the recorded coordinates of the second spot image.

In another aspect of the invention, there is provided an apparatus for aligning a lens and an opto-electronic device for assembly into a discrete package, the apparatus comprising:

a fixed light source for producing light of a selected wavelength, and optical means for transmitting that light as an initial beam;

a first manipulator for supporting a lens in the path of the initial beam and for moving that lens on command along mutually orthogonal X and Y axes that extend perpendicular to the initial beam, the lens being adapted to transmit and shape the initial beam so as to produce a modified beam;

a second manipulator for supporting an opto-electronic device in the path of the initial beam and for moving the opto-electronic device on command along mutually orthogonal X and Y axes that extend perpendicular to the initial beam;

a machine vision system comprising (a) an imaging device positioned to record an image of the initial beam, a lens-modified image of the initial beam produced by a lens carried by the first manipulator and a visible light image of an opto-electronic device carried by the second manipulator, and (b) a programmed means for generating a first error signal representative of the position of the center of the image of the lens-modified beam relative to the center of the image of the initial beam, and a second error signal representative of the position of the optical center of the opto-electronic device relative to the position of the center of the image of the lens-modified beam; and means for applying the first and second error signals to the first and second manipulators, respectively, so as to (a) cause the first manipulator to move in the X and/or Y directions to the extent required to make the center of the lens-modified beam coincide with the center of the initial beam and (b) cause the second manipulator to move in the X and/or Y directions to the extent required to make the optical center of the opto-electronic device coincide with the center of the lens-modified beam.

And in another aspect of the invention, there is provided a method for aligning a lens and an opto-electronic device for assembly into a discrete package, the method comprising:

(a) providing: (1) a light source for producing a beam of light that emulates the light which will exist in the package during its intended operation, and optical means for shaping that beam, (2) first and second manipulators each adapted to support a component and to move the supported component along mutually orthogonal X and Y axes that are perpendicular to the optical axis of the beam of light, and (3) a machine vision system having an imaging device that is aligned with the light source, the machine vision system being electrically coupled to the first and second manipulators so as to electrically control operation of the manipulators;

(b) energizing the light source so as to produce an initial image of the cross-sectional shape of the beam on the imaging device;

(c) operating the machine vision system so as to determine and record the center of the initial image;

(d) supporting a lens on the first manipulator so that the center axis of the lens extends substantially parallel to the beam;

(e) while the light source is energized, operating the first manipulator so that the center axis of the lens substantially coincides with the longitudinal axis of the beam, whereby the lens shapes the beam to produce a modified beam;

(f) operating the machine vision system so as to record the image of the cross-sectional shape of the modified beam formed on the imaging device;

(g) operating the machine vision system so as to determine the center of the recorded image of the modified beam;

(h) operating the machine vision system so as to compare the center of the modified image with the center of the initial image and to produce a correction signal representing the differences between the centers along the X and Y axes;

(i) using the correction signal to operate the first manipulator so as to move the lens along the X and/or Y axes until the center of the modified image coincides with the center of the initial image;

(j) supporting an opto-electronic device on the second manipulator so that the center axis of the opto-electronic device extends substantially parallel to the beam;

(k) operating the second manipulator so that the center of the opto-electronic device substantially coincides with the longitudinal axis of the beam;

(l) while the light source is de-energized, operating the machine vision system to record a visible light image of the opto-electronic device;

(m) operating the machine vision system to analyze the visible light image and determine therefrom the location of the optical axis of the opto-electronic device;

(n) operating the machine vision system so as to compare the center of the visible image with the center of the modified image and to produce a second correction signal representing the differences between the centers along the X and Y axes; and (o) using the second correction signal to operate the second manipulator so as to move the opto-electronic device along the X and/or Y axes until the center of the visible image coincides with the center of the modified image.

In still another aspect of the invention, there is provided an apparatus for aligning a lens and an opto-electronic device for assembly into a discrete package, the apparatus comprising:

a fixed light source for producing light of a selected wavelength, and optical means for transmitting that light as an initial beam along a selected path;

a first manipulator for supporting a beam-modifying lens along the path and for moving the lens on command along mutually orthogonal X and Y axes that extend perpendicular to the path;

a second manipulator for supporting an opto-electronic device along the path and for moving the opto-electronic device on command along mutually orthogonal X and Y axes that extend perpendicular to the path;

a machine vision system comprising (a) an imaging device positioned to record an image of the initial beam, images of the beam as modified by a lens carried by the first manipulator and visible light images of an opto-electronic device carried by the second manipulator, and (b) programmed means for generating a first error signal representative of the position of the center of the image of the initial beam in relation to the position of the center of the image of the beam as modified by a lens carried by the first manipulator and a second error signal representative of the position of the optical center of the opto-electronic device relative to the position of the center of the image of the beam as modified by a lens carried by the first manipulator; and means for applying the first and second error signals to the first and second manipulators respectively so as to (a) cause the first manipulator to move in the X and/or Y directions to the extent required to make the center of the image of the beam as modified by a lens carried by the first manipulator coincide with the center of the initial beam and (b) cause the second manipulator to move in the X and/or Y directions to the extent required to make the optical center of the opto-electronic device coincide with the center of the image of the beam as modified by a lens carried by the first manipulator.

And in still another aspect of the present invention, there is provided an apparatus for optically aligning an opto-mechanical device and a lens for directing light of a selected wavelength to and from the opto-mechanical device, the apparatus comprising:

a machine vision system comprising a camera having an electronic imaging device;

means for producing a light beam and directing it along a selected path to the camera, whereby to produce a spot image of the light beam on the imaging device;

a first X-Y axis manipulator for supporting a lens to be aligned; and a second X-Y manipulator for supporting an opto-mechanical device to be aligned with the lens;

the vision system also including a memory and a computer programmed to operate the camera and the first and second manipulators so as to execute the following steps: record an initial spot image of the beam and determine the coordinates of the center of the spot image, operate the first manipulator so that a lens supported thereby will intercept and modify the beam and produced a modified spot image on the imaging device, record the modified spot image, determine the coordinates of the center of the modified spot image and operate the first manipulator until the coordinates of the center of the modified spot image coincide with the coordinates of the center of the initial spot image, operate the second manipulator so that an opto-mechanical device supported thereby will be disposed in the path, produce an image of the opto-mechanical device on the imaging device and record that image, analyze the image of the opto-mechanical device to determine its optical center, and operate the second manipulator until the optical center of the opto-mechanical device coincides with the optical center of the modified spot image.

BRIEF DESCRIPTION OF THE DRAWINGS

These and other objects and features of the present invention will be more fully disclosed by the following detailed description of the preferred embodiments of the invention, which are to be considered together with the accompanying drawings wherein like numbers refer to like parts and further wherein.

DETAILED DESCRIPTION OF THE PREFERRED EMBODIMENTS

Figure 1:
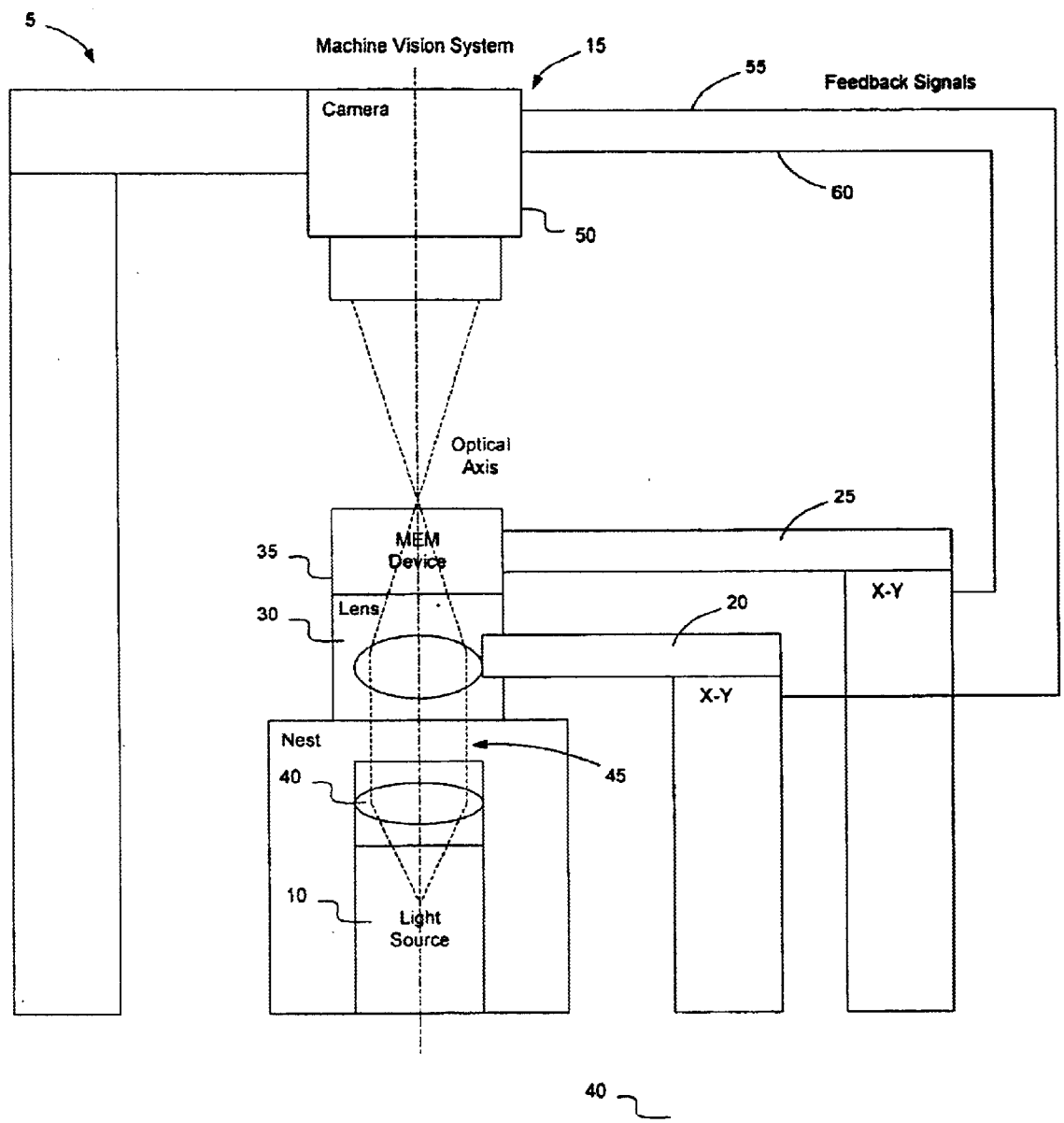
FIG. 1 is a diagrammatic view of an apparatus for precision alignment and assembly of opto-electronic components for fiber-optic networks.

Looking now at FIG. 1, there is shown an alignment and assembly apparatus 5 for precision alignment and assembly of opto-electronic components for fiber-optic networks. Alignment and assembly apparatus 5 generally comprises a light source 10 for producing light, a machine vision system 15 positioned relative to light source 10 so as to receive the light produced therefrom, and manipulators 20, 25 for supporting and selectively positioning a lens 30 and an opto-electronic device 35, respectively.

In a preferred embodiment of the invention, light source 10 produces a light beam with a wavelength in the non-visible spectrum (e.g., infra-red), and has an associated collimating lens 40, whereby to produce a light beam 45, so as to emulate light that will exist during normal operation in a telecommunications package containing lens 30 and opto-electronic device 35.

Machine vision system 15 is of the sort well known in the assembly art, e.g., it may be a machine vision system of the sort manufactured by Cognex of Natick, Mass. and sold under the trade name COGNEX PATMAX. Machine vision system 15 is shown including a camera 50 positioned toward light beam 45, which is emitted from light source 10, and further including signaling connections 55, 60 which link machine vision system 15 to manipulators 20, 25, respectively. Machine vision system 15 also includes an imaging device (not shown) of the sort normally included in machine vision systems for detecting images acquired by camera 50. This imaging device may be a semiconductor device such as a CCD device or a MOS device.

Manipulators 20, 25 are also of the sort well known in the assembly art, e.g., they may comprise various actuators allowing component positioning in the X and Y axes.

Figure 2:
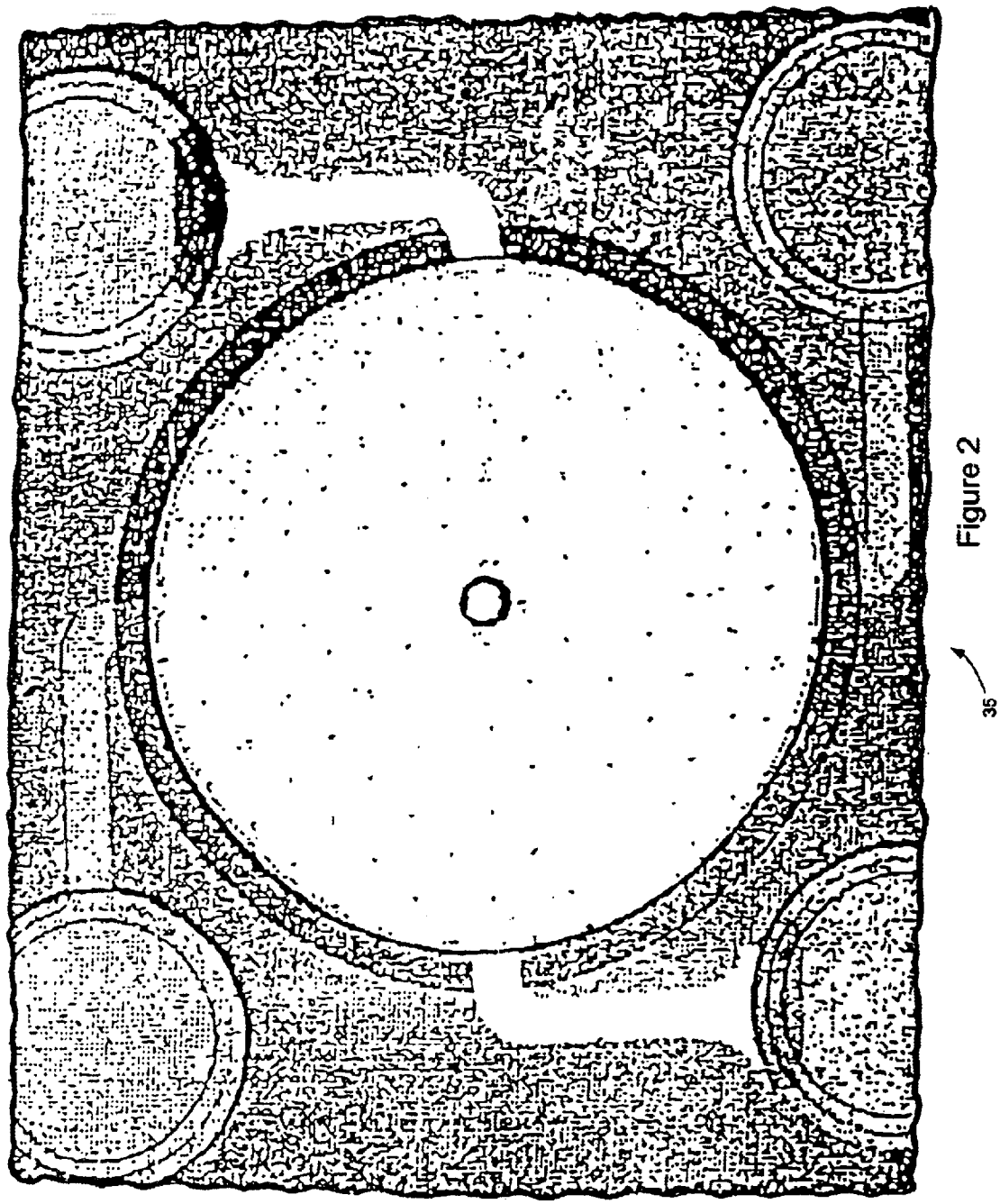
FIG. 2 is a top plan view of an exemplary opto-electronic component which may be aligned and positioned in an assembly in accordance with the present invention.

Opto-electronic device 35 is characterized by a distinctive geometric pattern on a surface of a plane perpendicular to its optical axis, which is parallel to light beam 45. See, for example, FIG. 2, which shows the top of an exemplary opto-electronic device 35. This distinctive geometric pattern allows machine vision system 15 to determine the position of the optical axis of opto-electronic device 35. Machine vision system 15 is configured to image the surface of the opto-electronic device and to subsequently compare this image to a comparative image having a known orientation relative to the position of the optical axis.

Alignment and assembly apparatus 5 is preferably used as follows.

First, light source 10 and lens 40 are used to produce a light beam of a selected shape and wavelength and direct it along a selected path to an imaging device contained within machine vision system 15, whereby a first spot image of the light beam is formed on the imaging device. This imaging device may be a semiconductor device such as a CCD or MOS device. Machine vision system 15 records the first spot image produced on the imaging device. Then machine vision system 15 determines the coordinates of the center of the first spot image. Next, lens 30 is positioned (via manipulator 20) so that (a) it intersects the axis of the light beam and (b) its center axis extends substantially parallel to the axis of the light beam, whereby the beam passes through and is modified by lens 30 and a second spot image of the modified light beam is formed on the imaging device. Machine vision system 15 records the second spot image produced on the imaging device. Then machine vision system 15 determines the coordinates of the center of the second spot image. Next, while the light source is energized, lens 30 is moved (via manipulator 20) laterally of the beam until the center of the second spot image coincides with the center of the first spot image.

Next, the opto-electronic device 35 is positioned (via manipulator 25) between the lens and the imaging device so that (a) it is adjacent to the lens, (b) it intersects the center axis of the beam and (c) its optical axis extends substantially parallel to the axis of the beam. Then, while the light source is de-energized, an image of the opto-electronic device is produced on the imaging device. This image of the opto-electronic device is recorded. Then the image of the opto-electronic device is compared with a pre-recorded geometrical pattern and, from this comparison, the X and Y coordinates of the optical axis of the opto-electronic device are determined. Then the opto-electronic device is moved until the X and Y coordinates of its optical axis coincide with the recorded coordinates of the second spot image. At this point the opto-electronic device may be secured to the lens so as to form a discrete component package.

In another preferred embodiment of the invention, camera 50 may be positionably configurable along an optical axis defined by light beam 45. In this embodiment of the invention, camera 50 is adjustable so as to change the depth of field and to obtain images of the initial beam incidence, the lens-modified beam incidence, and the opto-electronic device surface visual geometry with sufficient quality to facilitate component alignment.

And in another preferred embodiment of the invention, a mechanism (not shown) is provided to adjust camera 50 along the optical axis of light beam 45.

What is claimed is:

1. A method for aligning a lens and an opto-electronic device for assembly into a discrete package, said method comprising:

producing a light beam of a selected shape and wavelength and directing it along a selected path to an imaging device, whereby a first spot image of said light beam is formed on said imaging device;

recording said first spot image produced on said imaging device;

determining the coordinates of the center of said first spot image;

positioning a lens so that (a) it intersects the axis of said beam and (b) its center axis extends substantially parallel to the axis of said beam, whereby said beam passes through and is modified by said lens and a second spot image of said modified light beam is formed on said imaging device;

recording said second spot image produced on said imaging device;

determining the coordinates of the center of said second spot image;

while said light source is energized, moving said lens laterally of said beam until the center of said second spot image coincides with the center of said first spot image;

positioning a selected opto-electronic device with an optical axis between said lens and said imaging device so that (a) it is adjacent to said lens, (b) it intersects the center axis of said beam and (c) its optical axis extends substantially parallel to the axis of said beam;

while said light source is de-energized, producing an image of a said opto-electronic device on said imaging device;

recording said image of said opto-electronic device;

comparing said image of said opto-electronic device with a pre-recorded geometrical pattern and determining from said comparison the X and Y coordinates of the optical axis of said opto-electronic device; and moving said opto-electronic device until the X and Y coordinates of its said optical axis coincide with the recorded coordinates of said second spot image.

2. A method according to claim 1 further including the step of physically securing said opto-electronic device to said lens so as to form a discrete component package.

3. A method according to claim 1 wherein said light source produces a light beam with a wavelength in the non-visible spectrum, and said image of said opto-electronic device is a visible light image.

4. A method according to claim 1 wherein said imaging device is a semiconductor device.

5. A method according to claim 4 wherein said imaging device is a CCD or MOS device.

6. A method according to claim 1 wherein said opto-electronic device has an optical aperture, and its said optical axis is the center of said optical aperture.

7. A method according to claim 1 wherein said opto-electronic device is an optical filter or an optical switch.

8. A method according to claim 1 wherein said opto-electronic device is a Fabry-Perot tunable filter or a vertical cavity surface emitting laser (VCSEL).

9. A method according to claim 1 wherein said opto-electronic device is a pump laser.

10. Apparatus for aligning a lens and an opto-electronic device for assembly into a discrete package, said apparatus comprising:

a fixed light source for producing light of a selected wavelength, and optical means for transmitting that light as an initial beam;

a first manipulator for supporting a lens in the path of said initial beam and for moving said lens on command along mutually orthogonal X and Y axes that extend perpendicular to the said beam, said lens being adapted to transmit and shape said initial beam so as to produce a modified beam;

a second manipulator for supporting an opto-electronic device in the path of said initial beam and for moving said opto-electronic device on command along mutually orthogonal X and Y axes that extend perpendicular to the said beam;

a machine vision system comprising (a) an imaging device positioned to record an image of said initial beam, a lens-modified image of said beam produced by a lens carried by said first manipulator and a visible light image of an opto-electronic device carried by said second manipulator, and (b) a programmed means for generating a first error signal representative of the position of the center of the image of said lens-modified beam relative to the center of the image of said initial beam and a second error signal representative of the position of the optical center of said opto-electronic device relative to the position of the center of the image of said lens-modified beam; and means for applying said first and second error signals to said first and second manipulators, respectively, so as to (a) cause said first manipulator to move in the X and/or Y directions to the extent required to make the center of said lens-modified beam coincide with the center of said initial beam and (b) cause said second manipulator to move in the X and/or Y directions to the extent required to make the optical center of said opto-electronic device coincide with the center of the said lens-modified beam.

11. Apparatus according to claim 10 wherein said first and second error signals are generated sequentially in the order named in claim 10.

12. Apparatus according to claim 11 wherein said second error signal is generated and applied to said second manipulator after said first error signal has caused said first manipulator to move in the X and/or Y directions to the extent required to make the center of said modified beam coincide with the center of said initial beam.

13. A method for aligning a lens and an opto-electronic device for assembly into a discrete package, said method comprising:

(a) providing: (1) a light source for producing a beam of light that emulates the light which will exist in the package during its intended operation, and optical means for shaping that beam, (2) first and second manipulators each adapted to support a component and to move the supported component along mutually orthogonal X and Y axes that are perpendicular to the optical axis of said beam of light, and (3) a machine vision system having an imaging device that is aligned with said light source, said machine vision system being electrically coupled to said first and second manipulators so as to electrically control operation of said manipulators;

(b) energizing said light source so as to produce an initial image of the cross-sectional shape of said beam on said imaging device;

(c) operating said machine vision system so as to determine and record the center of said initial image;

(d) supporting a lens on said first manipulator so that the center axis of said lens extends substantially parallel to said beam;

(e) while said light source is energized, operating said first manipulator so that the center axis of said lens substantially coincides with the longitudinal axis of said beam, whereby said lens shapes said beam to produce a modified beam;

(f) operating said machine vision system so as to record the image of the cross-sectional shape of said modified beam formed on said imaging device;

(g) operating said machine vision system so as to determine the center of the recorded image of said modified beam;

(h) operating said machine vision system so as to compare the center of said modified image with the center of said initial image and to produce a correction signal representing the differences between said centers along said X and Y axes;

(i) using said correction signal to operate said first manipulator so as to move said lens along the X and/or Y axes until the center of said modified image coincides with the center of said initial image;

(j) supporting an opto-electronic device on said second manipulator so that the center axis of said opto-electronic device extends substantially parallel to said beam;

(k) operating said second manipulator so that the center of said opto-electronic device substantially coincides with the longitudinal axis of said beam;

(l) while said light source is de-energized, operating said machine vision system to record a visible light image of said opto-electronic device;

(m) operating said machine vision system to analyze said visible light image and determine therefrom the location of the optical axis of said opto-electronic device;

(n) operating said machine vision system so as to compare the center of said visible image with the center of said modified image and to produce a second correction signal representing the differences between said centers along said X and Y axes; and (o) using said second correction signal to operate said second manipulator so as to move said opto-electronic device along the X and/or Y axes until the center of said visible image coincides with the center of said modified image.

14. A method according to claim 13 further including the step of physically securing said opto-electronic device to said lens so as to form a discrete component package.

15. A method according to claim 13 wherein said first error signal represents the differences in coordinates measured along the X and Y axes between the centers of said initial image and said modified image.

16. A method according to claim 15 wherein said second error signal represents the differences in coordinates measured along the X and Y axes between the center of said modified image and the optical axis of the opto-electronic device.

17. A method according to claim 13 wherein said opto-electronic device has an optical aperture, and said second error signal represents the differences between the center of said optical aperture and the center of said modified image.

18. Apparatus for aligning a lens and an opto-electronic device for assembly into a discrete package, said apparatus comprising:

a fixed light source for producing light of a selected wavelength, and optical means for transmitting that light as an initial beam along a selected path;

a first manipulator for supporting a beam-modifying lens along said path and for moving said lens on command along mutually orthogonal X and Y axes that extend perpendicular to the said path;

a second manipulator for supporting an opto-electronic device along said path and for moving said opto-electronic device on command along mutually orthogonal X and Y axes that extend perpendicular to said path;

a machine vision system comprising (a) an imaging device positioned to record an image of said initial beam, images of said beam as modified by a lens carried by said first manipulator and visible light images of an opto-electronic device carried by said second manipulator, and (b) programmed means for generating a first error signal representative of the position of the center of the image of said initial beam in relation to the position of the center of the image of said beam as modified by a lens carried by said first manipulator and a second error signal representative of the position of the optical center of said opto-electronic device relative to the position of the center of the image of said beam as modified by a lens carried by said first manipulator; and means for applying said first and second error signals to said first and second manipulators, respectively, so as to (a) cause said first manipulator to move in the X and/or Y directions to the extent required to make the center of said image of the beam as modified by a lens carried by said first manipulator coincide with the center of said initial beam and (b) cause said second manipulator to move in the X and/or Y directions to the extent required to make the optical center of said opto-electronic device coincide with the center of the image of the beam as modified by a lens carried by said first manipulator.

19. Apparatus according to claim 18 wherein said light source produces an infra-red beam.

20. Apparatus for optically aligning an opto-mechanical device and a lens for directing light of a selected wavelength to and from the opto-mechanical device, said apparatus comprising:

a machine vision system comprising a camera having an electronic imaging device;

means for producing a light beam and directing it along a selected path to said camera, whereby to produce a spot image of said light beam on said imaging device;

a first X-Y axis manipulator for supporting a lens to be aligned; and a second X-Y manipulator for supporting an opto-mechanical device to be aligned with said lens;

said vision system also including a memory and a computer programmed to operate said camera, and said first and second manipulators so as to execute the following steps: record an initial spot image of said beam and determine the coordinates of the center of said spot image, operate said first manipulator so that a lens supported thereby will intercept and modify said beam and produced a modified spot image on said imaging device, record said modified spot image, determine the coordinates of the center of said modified spot image and operate said first manipulator until the coordinates of the center of said modified spot image coincide with the coordinates of the center of said initial spot image, operate said second manipulator so that an opto-mechanical device supported thereby will be disposed in said path, produce an image of said opto-mechanical device on said imaging device and record that image, analyze the image of the opto-mechanical device to determine its optical center, and operate said second manipulator until the optical center of said opto-mechanical device coincides with the optical center of said modified spot image.

21. Apparatus according to claim 20 wherein said light source produces an infra-red light beam, and said vision system is adapted to produce and record a visible light image of an opto-mechanical device supported by said second manipulator.

22. An apparatus according to claim 20 comprising a fixture that is fixed relative to said imaging device, and further wherein said means for producing a light beam comprises a said light source attached to said fixture, and an optical system secured to said fixture in position to shape said beam and direct it along said path.

23. An apparatus according to claim 22 wherein said first and second manipulators each have a support section for supporting a component to be aligned, and further wherein said fixture provides a supporting surface for said support section of said first manipulator, and said support section of said first manipulator provides a supporting surface for said support section of said second manipulator.

* * * * *